Nov. 8, 1960 H. C. GADDIS 2,959,162
HEAT EXCHANGE CELL FOR INTERNAL COMBUSTION ENGINE
Filed May 7, 1959
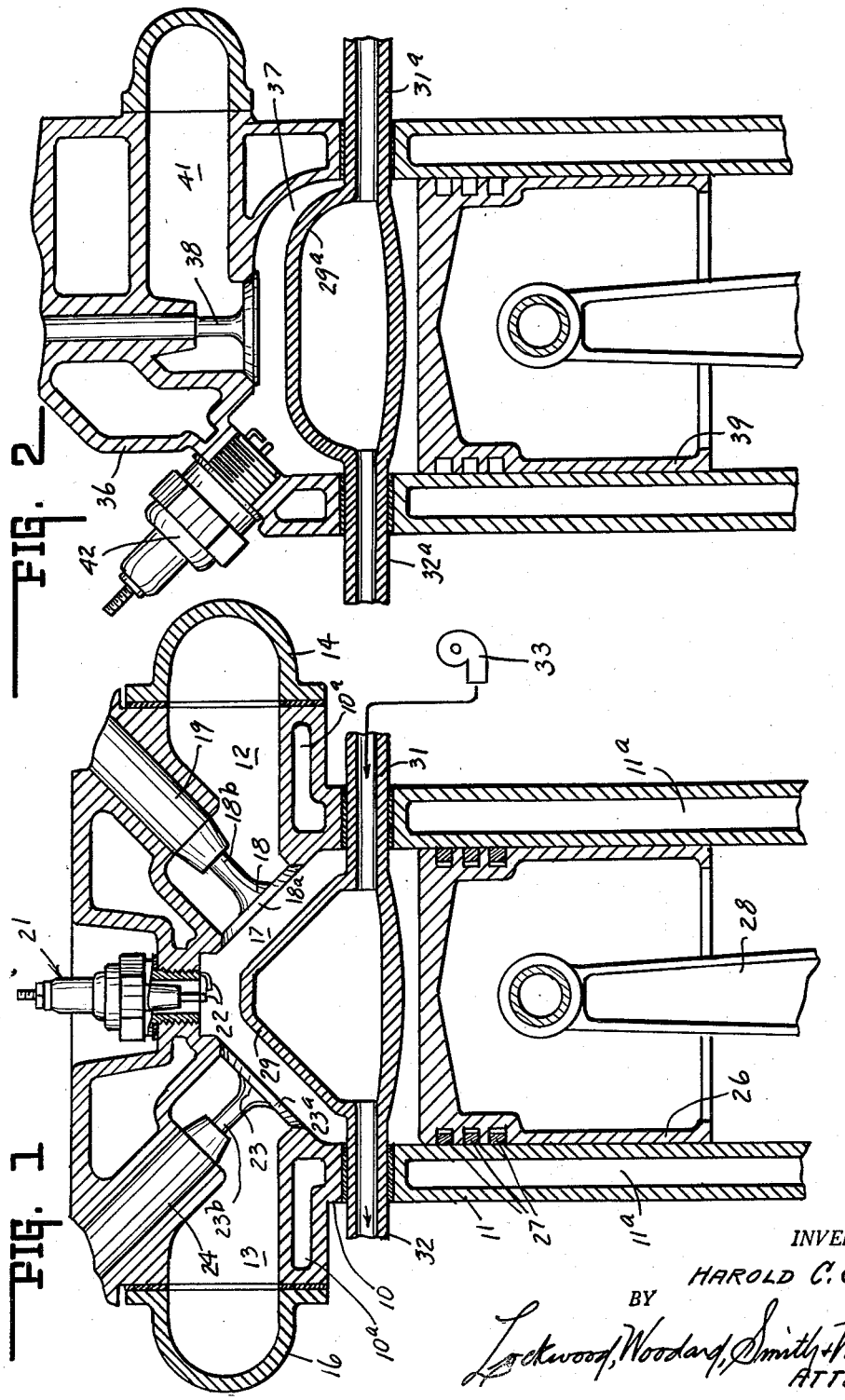
INVENTOR.
HAROLD C. GADDIS.
BY
Lockwood, Woodard, Smith + Weikart.
ATTORNEYS.

United States Patent Office 2,959,162
Patented Nov. 8, 1960

2,959,162

HEAT EXCHANGE CELL FOR INTERNAL COMBUSTION ENGINE

Harold C. Gaddis, 416 S. Mill St., Fairmount, Ind.

Filed May 7, 1959, Ser. No. 811,569

4 Claims. (Cl. 123—41.01)

This invention relates generally to circulating fluid heat exchange means and in particular to a heat exchange cell for removing heat from the gases within the combustion chamber of an internal combustion engine.

The present invention provides a metallic cell through which coolant fluid is circulated, the cell being mounted within the combustion chamber, between the cylinder head and piston, of the cylinders of an internal combustion engine. The cell is contoured to conform to the combustion chamber cavity in the engine cylinder head, that is, its upper surface generally parallels the exhaust valve face.

The cell is utilized to absorb or carry away a large increment of the heat of compression during the compression stroke of the piston. By removing the heat of compression the fuel mixture can be compressed without danger of pre-ignition. This permits the knock-free use of higher compression ratios with lower octane rated fuels. During the exhaust stroke of the piston the contour of the cell directs the spent gases so as to impinge upon the bevelled margin of the exhaust valve in general alignment with the valve head radius. The exhaust gases thus leave the cylinder at relatively high velocity thereby inducing complete scavenging of the cylinder and reducing contamination of the subsequently incoming charge of fuel-air mixture. The improved scavenging of the cylinder and better distribution of the fuel-air mixture because of the presence of the heat exchange cell also minimizes the build-up of layers of burnt gases which tend to isolate the fuel charge thereby causing erratic combustion.

The primary object of the present invention is, therefore, to provide a heat exchange cell for an internal combustion engine which produces improved engine performance by removing the heat generated in the compression stroke of the engine and which further serves to direct the flow of fuel and exhaust gases within the combustion chamber.

The full nature of the invention will be understood from the accompanying drawings and the following description and claims:

Fig. 1 is a side sectional view of one cylinder of an internal combustion engine incorporating the apparatus of the present invention.

Fig. 2 is a view similar to Fig. 1 but showing a modified form of the apparatus of the present invention.

Referring initially to Fig. 1, there is shown a portion of one cylinder of an internal combustion engine which includes the cylinder head 10 and the engine block 11. Conventional passages 10a and 11a are formed in the cylinder head and block, respectively to permit the circulation of cooling fluid therein. The cylinder head is provided with fuel charge inlet and outlet passages 12 and 13, respectively. The inlet passage communicates with the conventional inlet manifold 14 and the exhaust passage communicates with the conventional exhaust manifold 16.

The cylinder head has formed therein a generally domed cavity 17, the passages 12 and 13 communicating therewith. The passage 12 is controlled by a conventional poppet-type inlet valve 18 having a beveled margin 18a. The stem 18b of the valve extends slidably through a sleeve 19 mounted in the cylinder head, it being understood that the valve 18 is reciprocated in conventional fashion by a cam means (not shown), whereby a fuel air charge may be introduced into the combustion chamber or cavity 17. A conventional spark plug for ignition of the fuel is shown at 21, its electrodes 22 being disposed adjacent the cavity 17.

The exhaust passage 13 is controlled by a poppet-type valve 23, having a beveled margin 23a. The stem 23b of the valve 23 extends into a sleeve 24 disposed within the cylinder head. The valve 23 and its operation are conventional, the valve permitting the cavity 17 to be purged of spent gases during the exhaust stroke of the piston. The engine block 11 is provided with a bore within which the piston 26 is reciprocable, the piston carrying conventional piston rings 27. A connecting rod 28 serves to link the piston to a crank shaft (not shown).

The apparatus so far described is conventional and serves as environment for the structure of the present invention now to be described. Disposed within the cavity 17 and somewhat above the upper face of the piston 26 is a hollow metallic cell 29 having a domed configuration so that its sloping sides in general parallel the sides of the cavity 17. Extending from opposite sides of the cell 29 are tubes 31 and 32, the tubes extending through the engine block in sealed relation thereto. The tube 31 may be connected to a suitable source of coolant fluid under pressure such as the pump indicated schematically at 33. Tube 32 serves as the outlet passage for the fluid circulated through the cell 29.

In operation, with the valves 18 and 23 closed, as the piston moves upwardly on a compression stroke, the coolant circulating through the cell 29 functions to remove the heat of compression from the gases by conduction. The compressed fuel mixture may thus be maintained at a relatively low temperature, minimizing the danger of pre-ignition. During the intake stroke of the piston when the valve 18 is open, the domed configuration of the cell serves to evenly distribute the fuel charge within the cavity 17, thereby aiding combustion. During the exhaust stroke of the piston, that is, when the valve 23 is open, the spent gases are induced to flow about the cell so that they impinge upon the beveled margin 23a of the exhaust valve 23, the gases approaching the valve radially. The spent gases are thus driven into the passage 13 at relatively high velocity and thus provide a complete scavenging of the cylinder. The improved scavenging and fuel distribution reduces the tendency for layers of burnt gases to accumulate within the cylinder, causing erratic combustion.

Fig. 2 shows a modified form of the apparatus of the present invention incorporated into a further conventional type of cylinder head indicated at 36. In this type of cylinder head the combustion cavity 37 has a curved configuration with the exhaust valve 38 disposed directly above the piston 39. The exhaust valve controls the flow of gases through an exhaust passage 41. The cylinder head mounts a conventional spark plug 42 for ignition of the fuel charge. The hollow metallic cell 29a differs from that of Fig. 1 in that it as a flat, concavo convex configuration so that its upper wall in general parallels the sides of the cavity 37. The cell is provided with inlet and outlet tubes 31a and 32a which may be connected to a coolant fluid circulation system. The operation of the modified form of the cell is identical to that described with reference to Fig. 1.

It will be understood that the inlet and outlet tubes communicating with the interior of the heat exchange cell may be connected to a separate source of coolant as indicated in Fig. 1, or may be connected to the main cooling system of the engine. While the cell has been illustrated herein as having alternate forms, it will be understood that other configurations might also provide the desired function, the principle requirement being that the cell be shaped so that its upper wall generally parallels the configuration of the combustion cavity in the cylinder head.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In an internal combustion engine, a cylinder head having a cavity therein of domed configuration, poppet-type intake and exhaust valves extensible into said cavity for opening intake and exhaust passages respectively, a piston chamber communicating with said cavity and having a piston movable therein to compress a fuel charge in said cavity to accomplish a working stroke upon ignition of the charge and to purge said chamber of spent gases subsequent to the working stroke, a hollow domed cell disposed within said cavity and having its wall spaced from and generally parallel with the wall of said cavity, and means for circulating coolant through said cell whereby heat may be removed from the fuel charge during the compression stroke of said piston, said cell serving to direct spent gases radially against said exhaust valve and into said exhaust passage during the purging stroke of said cylinder.

2. In an internal combustion engine, a cylinder head having a cavity therein, poppet-type intake and exhaust valves extensible into said cavity for opening intake and exhaust passages respectively, a piston chamber communicating with said cavity and having a piston movable therein to compress a fuel charge in said cavity to accomplish a working stroke upon ignition of the charge and to purge said chamber of spent gases subsequent to the working stroke, a hollow cell disposed within said cavity and having its wall spaced from and generally parallel with the wall of said cavity, said cell being adapted to have coolant circulated therethrough whereby heat may be removed from the fuel charge during the compression stroke of said piston, said cell serving to direct spent gases radially against said exhaust valve and into said exhaust passage during the purging stroke of said cylinder.

3. In an internal combustion engine, a cylinder head having a cavity therein, an exhaust valve extensible into said cavity for opening an exhaust passage, a piston chamber communicating with said cavity and having a piston movable therein to compress a fuel charge in said cavity to accomplish a working stroke upon ignition of the charge and to purge said chamber of spent gases subsequent to the working stroke, a hollow cell disposed within said cavity and having its wall spaced from the wall of said cavity, said cell being adapted to have coolant circulated therethrough whereby heat may be removed from the fuel charge during the compression stroke of said piston, said cell serving to direct spent gases radially against said exhaust valve and into said exhaust passage during the purging stroke of said cylinder.

4. In an internal combustion engine, a cylinder head having a cavity therein, an exhaust valve extensible into said cavity for opening an exhaust passage, a piston chamber communicating with said cavity and having a piston movable therein to compress a fuel charge in said cavity to accomplish a working stroke upon ignition of the charge and to purge said chamber of spent gases subsequent to the working stroke, a hollow cell disposed within said cavity and having its wall spaced from the wall of said cavity, and means for circulating coolant through said cell whereby heat may be removed from the fuel charge during the compression stroke of said piston.

References Cited in the file of this patent

UNITED STATES PATENTS 2,738,782    Bodine    Mar. 20, 1956

FOREIGN PATENTS 1,002,161    Germany    Feb. 7, 1957